United States Patent
Mola (10) Patent No.: US 11,899,562 B2
(45) Date of Patent: *Feb. 13, 2024

(54) COPROCESSOR-BASED LOGGING FOR TIME TRAVEL DEBUGGING

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 37 days.

This patent is subject to a terminal disclaimer.

(21) Appl. No.: 17/381,034

(22) Filed: Jul. 20, 2021

(65) Prior Publication Data

US 2021/0349805 A1 Nov. 11, 2021

Related U.S. Application Data

(63) Continuation of application No. 16/401,932, filed on May 2, 2019, now Pat. No. 11,126,537.

(51) Int. Cl.
*G06F 9/44* (2018.01)
*G06F 9/445* (2018.01)
(Continued)

(52) U.S. Cl.
CPC ........ *G06F 11/364* (2013.01); *G06F 9/30098* (2013.01); *G06F 9/3877* (2013.01);
(Continued)

(58) Field of Classification Search
CPC .. G06F 11/364; G06F 9/30098; G06F 9/3877; G06F 9/522; G06F 12/0811; G06F 12/0835

See application file for complete search history.

(56) References Cited

U.S. PATENT DOCUMENTS 8,019,944 B1* 9/2011 Favor .................... G06F 9/3863
711/146
9,223,677 B2* 12/2015 Swaine ................ G06F 11/348
(Continued)

FOREIGN PATENT DOCUMENTS

CN 109388585 A * 2/2019 ......... G06F 12/0802
CN 109564543 A * 4/2019 ........... G06F 1/3225
(Continued)

OTHER PUBLICATIONS

Hari Kannan, Decoupling Dynamic Information Flow Tracking with a Dedicated Coprocessor, 2009, pp. 105-115. https://ieeexplore.ieee.org/stamp/stamp.jsp?tp=&arnumber=5270347 (Year: 2009).*
(Continued)

*Primary Examiner* — Mongbao Nguyen
(74) *Attorney, Agent, or Firm* — Workman Nydegger (57) ABSTRACT

A tracing coprocessor that records execution trace data based on a cache coherency protocol (CCP) message. The tracing coprocessor comprises logic that causes the tracing coprocessor to listen on a bus that is communicatively coupled to a primary processor that executes executable code instructions. The logic also causes the tracing coprocessor to, based on listening on the bus, identify at least one CCP message relating to activity at a processor cache. The logic also causes the tracing coprocessor to identify, from the at least one CCP message, a memory cell consumption by the primary processor. The logic also causes the tracing coprocessor to initiate logging, into an execution trace, at least a memory cell data value consumed by the primary processor in connection with execution of at least one executable code instruction.

20 Claims, 4 Drawing Sheets

(51) Int. Cl.
  *G06F 9/455* (2018.01)
  *G06F 11/36* (2006.01)
  *G06F 9/30* (2018.01)
  *G06F 9/38* (2018.01)
  *G06F 9/52* (2006.01)
  *G06F 12/0811* (2016.01)
  *G06F 12/0831* (2016.01)

(52) U.S. Cl.
  CPC .......... *G06F 9/522* (2013.01); *G06F 12/0811* (2013.01); *G06F 12/0835* (2013.01)

(56) References Cited

U.S. PATENT DOCUMENTS

| | | | | |
|---|---|---|---|---|
| 9,329,890 | B2* | 5/2016 | Busaba | G06F 12/0815 |
| 11,068,400 | B2* | 7/2021 | Kolli | G06F 9/467 |
| 2011/0202801 | A1* | 8/2011 | Horley | G06F 11/348 714/45 |
| 2014/0052930 | A1* | 2/2014 | Gulati | G06F 11/3636 714/45 |
| 2015/0127983 | A1* | 5/2015 | Trobough | G06F 11/2733 714/30 |
| 2016/0378661 | A1* | 12/2016 | Gray | G06F 11/3466 712/237 |
| 2017/0083334 | A1* | 3/2017 | Burger | G06F 9/30043 |
| 2017/0147496 | A1* | 5/2017 | Sasanka | G06F 9/383 |
| 2017/0286111 | A1* | 10/2017 | Pereira | G06F 11/3466 |
| 2018/0004521 | A1* | 1/2018 | Kleen | G06F 9/30145 |
| 2018/0060214 | A1* | 3/2018 | Mola | G06F 11/3636 |
| 2018/0165213 | A1* | 6/2018 | Bernat | G06F 12/0822 |
| 2018/0349280 | A1* | 12/2018 | Prasad | G06F 12/128 |
| 2019/0114422 | A1* | 4/2019 | Johnson | G06F 9/30105 |
| 2020/0183736 | A1* | 6/2020 | Kesiraju | G06F 9/30043 |

FOREIGN PATENT DOCUMENTS

| | | | | |
|---|---|---|---|---|
| EP | 2639702 B1 | * | 2/2016 | .......... G06F 11/3636 |
| GB | 2403560 A | * | 1/2005 | ......... G06F 12/0831 |
| TW | I270769 B | * | 1/2007 | .......... G06F 11/2236 |

OTHER PUBLICATIONS

Mounika Ponugoti, Exploiting Cache Coherence for Effective On-the-Fly Data Tracing in Multicores, 2016, pp. 312-319. https://ieeexplore.ieee.org/stamp/stamp.jsp?tp=&arnumber=7753295 (Year: 2016).*

Suzana Milutinovic, Increasing the Reliability of Software Timing Analysis for Cache-Based Processors, 2019. pp. 836-850. https://ieeexplore.ieee.org/stamp/stamp.jsp?tp=&arnumber=8603793 (Year: 2019).*

Vladimir Uzelac, Hardware-Based Load Value Trace Filtering for On-the-Fly Debugging, 2013, pp. 1-18. https://dl.acm.org/doi/pdf/10.1145/2465787.2465799 (Year: 2013).*

"Office Action Issued in European Patent Application No. 20722828.9", dated Sep. 1, 2023, 5 Pages.

U.S. Appl. No. 16/401,932, filed May 2, 2019.

"Office Action Issued in Indian Patent Application No. 202147044723", dated Nov. 15, 2023, 7 Pages.

* cited by examiner

COPROCESSOR-BASED LOGGING FOR TIME TRAVEL DEBUGGING

CROSS-REFERENCE TO RELATED APPLICATIONS

This application is a continuation of U.S. patent application Ser. No. 16/401,932, filed May 2, 2019, and entitled "COPROCESSOR-BASED LOGGING FOR TIME TRAVEL DEBUGGING," the entire contents of which are incorporated by reference herein in their entirety.

BACKGROUND

Tracking down and correcting undesired software behaviors in software code, often referred to as "debugging" code, is a core activity in software development. Undesired software behaviors can include many things, such as execution crashes, runtime exceptions, slow execution performance, incorrect data results, data corruption, and the like. Undesired software behaviors might be triggered by a vast variety of factors such as data inputs, user inputs, race conditions (e.g., when accessing shared resources), etc. Given the variety of triggers, undesired software behaviors can be rare and seemingly random, and extremely difficult reproduce. As such, it can be very time-consuming and difficult for a developer to identify a given undesired software behavior. Once an undesired software behavior has been identified, it can again be time-consuming and difficult to determine its root cause(s).

One approach developers have used to debug code is to use "live" debuggers. In general, a live debugger attaches to a live process's execution and enables a developer to monitor and guide that process's forward execution. For example, a live debugger may enable a developer to set a breakpoint that pauses the program's execution when it reaches particular instruction, to set a watchpoint that pauses the program's execution when it accesses a particular memory addresses, to single-step through lines of code as it executes, etc.

An emerging form of diagnostic tools enable "historic" debugging (also referred to as "time travel" or "reverse" debugging), in which the execution of at least a portion of a program's thread(s) is recorded/traced into one or more trace files (i.e., a trace). Using some tracing techniques, a trace can contain very high-fidelity "bit-accurate" historic trace data, which enables the recorded portion(s) the traced thread(s) to be virtually "replayed" at great fidelity—even down to the granularity of individual instructions (e.g., machine code instructions, intermediate language code instructions, etc.). Thus, using bit-accurate trace data, a "time travel" debugger enables a developer to not only monitor and guide a forward emulation of traced code (e.g., via breakpoints, watchpoints, single-stepping, etc.), but to also monitor and guide a reverse emulation of traced code (e.g., via reverse breakpoints, reverse watchpoints, reverse single-stepping, etc.). Thus, a developer can monitor and guide execution of any part of a programs prior trace.

As mentioned, historic debugging technologies record a program's execution with great fidelity (potentially bit-accurate). With the extremely high number of instructions that modern processors can execute per second, this results in a great volume of trace data. Recording this data can have significant performance impacts on the program being traced.

BRIEF SUMMARY

At least some embodiments described herein alleviate some of the performance impacts on a traced program by using a coprocessor to store at least part of an execution trace based on code execution at a primary processor. In particular, during code execution, a primary processor sends messages, such as cache coherency protocol (CCP) messages, onto a bus. These messages relate to consumption of data by the primary processor, and can include cache influxes. The coprocessor receives these messages from the bus and, based on those messages, records at least part of an execution trace on the primary processor's behalf.

In some embodiments, a computer system comprises a primary processor that is associated with a memory cache, a coprocessor, and a bus interconnecting the primary processor and the coprocessor. The computer system is configured to store at least part of an execution trace using the coprocessor. Storing at least part of the execution trace can include the primary processor executing one or more executable instructions of an executable entity. Based on the primary processor executing the one or more executable instructions, the primary processor sends one or more CCP messages on the bus. The one or more CCP messages correspond to a memory cell. Also Based on the primary processor executing the one or more executable instructions, the primary processor consumes data for the memory cell. The coprocessor receives the one or more CCP messages from the bus and, based on the coprocessor receiving the one or more CCP messages, the coprocessor initiates storing the consumed data for the memory cell into the execution trace.

In other embodiments, a method is implemented at a computer system that includes a primary processor that is associated with a memory cache, a coprocessor, and a bus interconnecting the primary processor and the coprocessor. The method for stores at least part of an execution trace using the coprocessor. The method comprises executing, at the primary processor, one or more executable instructions of an executable entity. Based on the primary processor executing the one or more executable instructions, the method also comprises sending, by the primary processor, one or more CCP messages on the bus, the one or more CCP messages corresponding to a memory cell, and consuming, the primary processor, data for the memory cell. The method also comprises receiving, by the coprocessor, the one or more CCP messages from the bus and, based on the coprocessor receiving the one or more CCP messages, initiating, by the coprocessor, storing the consumed data for the memory cell into the execution trace.

In yet other embodiments, a coprocessor stores at least part of an execution trace based on code execution at a primary processor. The coprocessor includes control logic that configures the coprocessor to listen to a bus that interconnects the primary processor and the coprocessor and receive one or more CCP messages from the bus. The one or more CCP messages were sent on the bus by the primary processor, based on the primary processor having consumed data for a memory cell. Based on receiving the one or more CCP messages, the coprocessor initiates storing of the consumed data for the memory cell into an execution trace.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein alleviate some of the performance impacts on a traced program by using a coprocessor to store at least part of an execution trace based on code execution at a primary processor. In particular, during code execution, a primary processor sends messages, such as cache coherency protocol (CCP) messages, onto a bus. These messages relate to consumption of data by the primary processor, and can include cache influxes. The coprocessor receives these messages from the bus and, based on those messages, records at least part of an execution trace on the primary processor's behalf.

Figure 1:
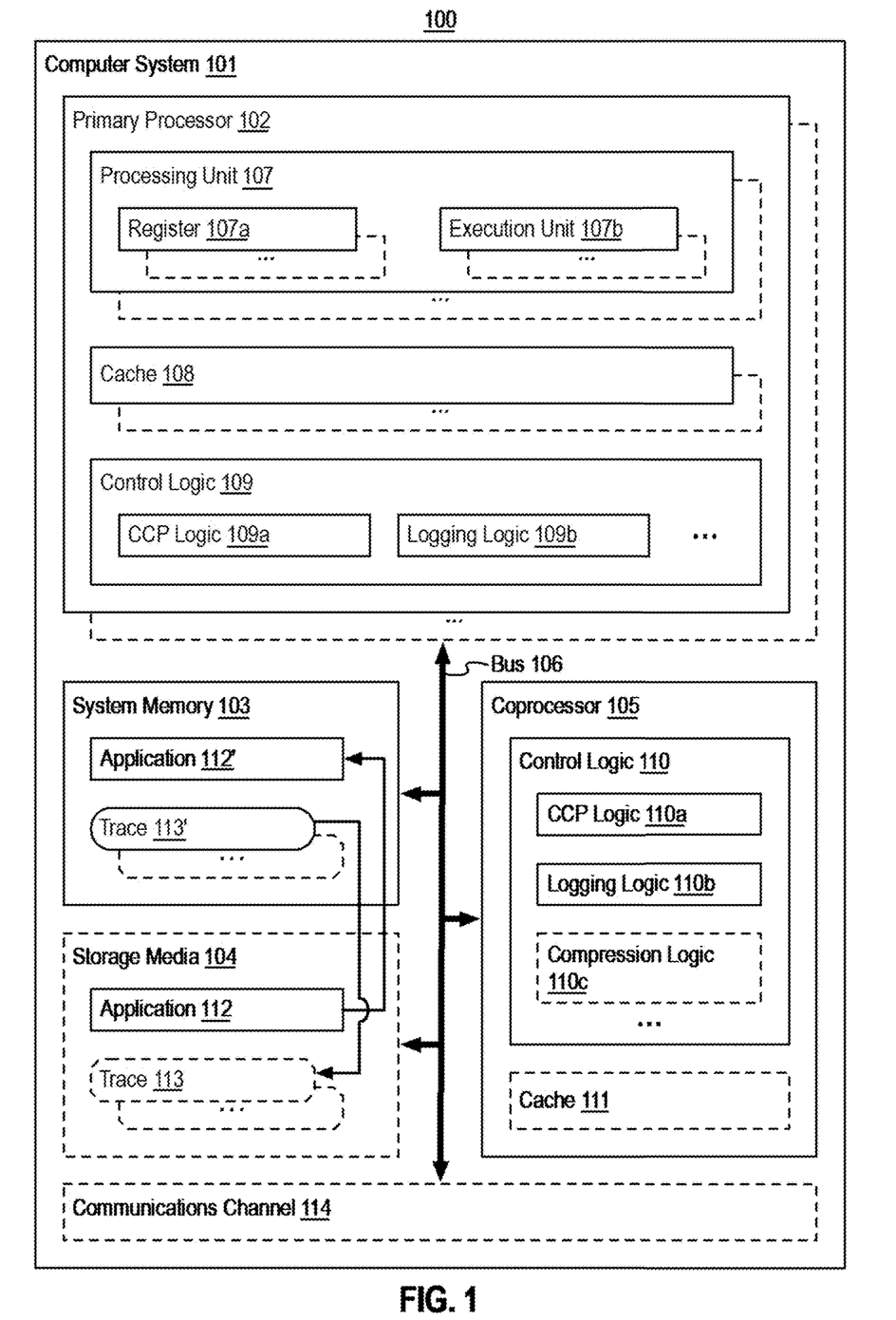
FIG. 1 illustrates an example computing environment that facilitates storing at least part of an execution trace using a coprocessor.

To the accomplishment of the foregoing, FIG. 1 illustrates an example computing environment 100 that facilitates storing at least part of an execution trace using a coprocessor. As depicted, computing environment 100 may comprise or utilize a special-purpose or general-purpose computer system 101, which can include computer hardware, such as, for example, one or more primary processors 102 that are generally responsible for execution application code (e.g., of application 112), system memory 103 that is generally responsible for temporary data storage, one or more computer-readable storage media 104 for storing application code and/or data, at least one coprocessor 105 that is generally responsible for logging at least a portion of execution application code (e.g., of application 112) at the one or more primary processors 102, and one or more external communications channels 114 (e.g., a network interface card, or even simply one or more wires/pins). Each of the primary processor(s) 102, the system memory 103, and the coprocessor 105 are communicatively coupled using one or more communications buses 106.

As shown in FIG. 1, each primary processor 102 (also referred to hereinafter more succinctly as processor 102) can include (among other things) one or more processing units 107 (e.g., processor cores) and one or more caches 108. Each processing unit 107 loads and executes machine code instructions (e.g., of application 112) via the caches 108. During execution of these machine code instructions at one more execution units 107b, the instructions can use internal processor registers 107a as temporary storage locations and can read and write to various locations in system memory 103 via a cache 108.

In embodiments, operation of the processor 102 is orchestrated, at least in part, by control logic 109. As indicated by the ellipses within the control logic 109, the control logic 109 can do many things. However, for simplicity in illustration, the control logic 109 shows only logic components (i.e., CCP logic 109a and logging logic 109b) that are used herein to describe how the processor 102 might help facilitate storing at least part of an execution trace using the coprocessor 105. As will be appreciated by one of ordinary skill in the art, control logic 109 could comprise digital logic (e.g., a fixed arrangement of transistors; one or more programmed field programmable gate arrays; and the like), and/or stored executable instructions (e.g., processor microcode) that are executable by one or more components of the processor 102.

Returning to cache 108, the cache 108 temporarily caches portions of data stored in the system memory 103; for example, a cache 108 might include a "code" portion that caches portions of system memory 103 storing application code (e.g., of application 112), and a "data" portion that caches portions of system memory 103 storing application runtime data. If a processing unit 107 requires data (e.g., code or application runtime data) not already stored in the cache 108, then the processing unit 107 can initiate a "cache miss," causing the needed data to be fetched from a backing store (e.g., system memory 103, another cache, etc.). For example, in FIG. 1, the backing store for caches 108 might be system memory 103, so a cache miss might be served by system memory 103. At times, data may be "evicted" from the cache 108 back to its backing store (e.g., system memory 103), such as when data is no longer needed in the cache 108, or when more urgent data is needed in the cache).

Figure 2:
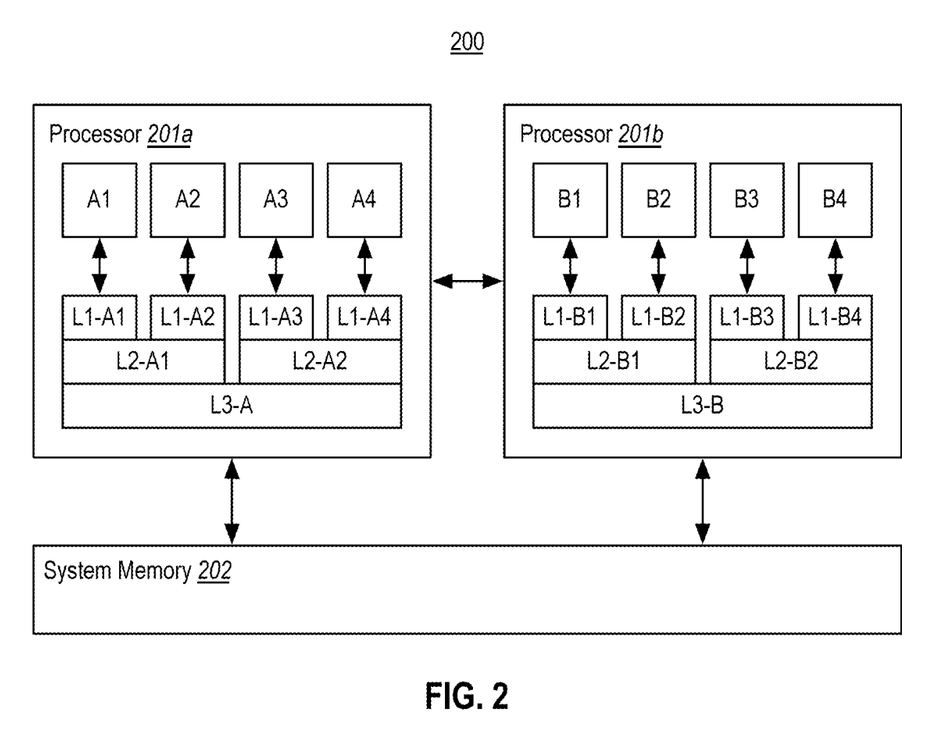
FIG. 2 illustrates an example computing environment including multi-layer caches.

To explain these concepts further, FIG. 2 illustrates an example environment 200 demonstrating multi-layer caches. In FIG. 2, there are two processors 201a and 201b (e.g., each corresponding to a different processor 102 of FIG. 1) and a system memory 202 (e.g., corresponding to system memory 103 of FIG. 1). In the example environment 200, each processor 201 includes four physical processing units (i.e., units A1-A4 for processor 201a and units B1-B4 for processor 210b, which might correspond to processing units 107 of FIG. 1). Example environment 200 also includes a three-layer cache hierarchy within each processor 201. Environment 200 is one example cache layout only, and it is not limiting to the cache hierarchies in which the embodiments herein may operate. In environment 200, each processing unit is associated with its own dedicated L1 cache (e.g., L1 cache "L1-A1" in processor 201a for unit A1, L1 cache "L1-A2" in processor 201a for unit A2, etc.). Each processor 201 also includes two L2 caches (e.g., L2 cache "L2-A1" in processor 201a that serves as a backing store for L1 caches L1-A1 and L1-A2, L2 cache "L1-A2" in processor 201a that serves as a backing store for L1 caches L1-A3 and L1-A4, etc.). Finally, each processor 201 also includes a single L3 cache (e.g., L3 cache "L3-A" in processor 201a that serves as a backing store for L2 caches L2-A1 and L2-A2, and L3 cache "L3-B" in processor 201b that serves as a backing store for L2 caches L2-B1 and L2-B2). As shown, system memory 202 serves as a backing store for the L3 caches L3-A and L3-B. In this arrangement, and depending on cache implementation, cache misses in an L1 cache might by served by its corresponding L2 cache, its corresponding L3 cache, and/or system memory 202; cache misses in an L2 cache might by served by its corresponding L3 cache and/or system memory 202; and cache misses in an L3 cache might by served by system memory 202.

As demonstrated in FIG. 2, when multiple cache layers are used, the processing unit(s) might interact directly with the closest layer (e.g., L1), though this need not always be the case. In most situations, data flows between the layers (e.g., an L3 cache interacts with the system memory 103 and serves data to an L2 cache, and the L2 cache in turn serves data to the L1 cache). When a processing unit performs a write, the caches coordinate to ensure that those caches that have affected data that was shared among the processing unit(s) 102*a* don't have it anymore. This coordination is performed using a cache coherency protocol (CCP).

The caches in environment 200 may thus be viewed as "shared" caches. For example, each L2 and L3 cache serves multiple processing units within a given processor 201 and are thus shared by the processing units. The L1 caches within a given processor 201, collectively, can also be considered shared—even though each one corresponds to a single processing unit—because the individual L1 caches may coordinate with each other (i.e., via a CCP) to ensure consistency (i.e., so that each cached memory location is viewed consistently across all the L1 caches). The L2 caches within each processor 201 similarly may coordinate via a CCP. Additionally, if the processor 201 supports hyper-threading, each individual L1 cache may be viewed being shared by two or more logical processing units and are thus "shared" even at an individual level.

As mentioned, when multiple caches 108 are present (as in FIG. 2) a processor 102 operates on the caches 108 according to one or more CCPs. In general, a CCP defines how consistency is maintained between the various caches as the various processing units 107 of one or more processors 102 read from and write to data in the various caches, and how to ensure that the various processing units always read valid data from a given location in the caches. CCPs are typically related to, and enable, a memory model defined by the processor's instruction set architecture (ISA). Examples of popular ISA's include the x86 and x86_64 families of architectures from INTEL, and the ARM architecture from ARM HOLDINGS.

Examples of common CCPs include the MSI protocol (i.e., Modified, Shared, and Invalid), the MESI protocol (i.e., Modified, Exclusive, Shared, and Invalid), and the MOESI protocol (i.e., Modified, Owned, Exclusive, Shared, and Invalid). Each of these protocols define a state for individual locations (e.g., lines) in a shared cache 108. A "modified" cache location contains data that has been modified in the cache 108 and is therefore inconsistent with the corresponding data in the backing store (e.g., system memory 103 or another cache). When a location having the "modified" state is evicted from the cache 108, common CCPs require the cache to guarantee that its data is written back the backing store, or that another cache take over this responsibility. A "shared" cache location contains data that is unmodified from the data in the backing store, exists in read-only state, and is shared by the processing unit(s) 107. The cache 108 can evict this data without writing it to the backing store. An "invalid" cache location contains no valid data and can be considered empty and usable to store data from cache miss. An "exclusive" cache location contains data that matches the backing store and is used by only a single processing unit 107. It may be changed to the "shared" state at any time (i.e., in response to a read request) or may be changed to the "modified" state when writing to it. An "owned" cache location is shared by two or more processing units 107, but one of the processing units has the exclusive right to make changes to it. When that processing makes changes, it notifies the other processing units—since the notified processing units may need to invalidate or update based on the CCP implementation.

Referring again to FIG. 1, the storage media 104 can store computer-executable instructions and/or data structures representing executable software components, such as application 112; correspondingly, during execution of this software at the processor(s) 102, one or more portions of these computer-executable instructions and/or data structures can be loaded into system memory 103 (i.e., shown as application 112'). In addition, the storage media 104 might store one or more execution traces 113, such as traces representing execution of application 112 at processor 102. Storage media 104 is shown in broken lines, indicating that it might be optional. For example, application 112 might alternatively be received over an external communications channel 114, and/or traces 113 might alternatively be communicated over an external communications channel 114.

During execution of application 112, the processor 102 and the coprocessor 105 cooperate to record an execution trace representing execution one or more portions of the application's execution. This execution trace might be at least temporally stored in system memory 103 (i.e., trace 113'). From there, it might be persisted to the storage media 104 (i.e., trace(s) 113), and/or be sent to another computer system via a communications channel 114. Alternatively, an execution trace might be sent to another computer system via a communications channel 114 directly, bypassing, system memory 103 altogether.

In embodiments, the coprocessor 105 records at least a portion of an execution trace based on CCP messages sent by the processor 102 over the bus 106. Thus, the bus 106 in FIG. 1 can represent any number (i.e., one or more) of busses that are capable of communicating at least a subset of CCP messages between the processor 102 and the coprocessor 105. For instance, the bus 106 in FIG. 1 might implement at least a subset of the Advanced Microcontroller Bus Architecture (AMBA) bus architecture standard—which can support a variety of bus technologies/types, such as the Coherent Hub Interface (CHI), the Advanced eXtensible Interface (AXI), AXI Coherency Extensions (ACE), the Advanced High-Performance Bus (AHB), the Advanced Peripheral Bus (APB), and/or the Advanced Trace Bus (ATB). However, as will be appreciated by one of ordinary skill in the art, the embodiments herein could operate within other bus architectures as well (both existing and yet to be developed).

In embodiments, the processor 102 and the coprocessor 105 cooperate to record an execution trace into trace 113/113' that represent a high-fidelity recording of a prior execution of one or more threads of application 112 at the processor 102, and in which the trace data enables any traced portion(s) of those thread(s) to be emulated (i.e., "replayed") later—even down to the granularity of individual machine code instructions in the ISA of processor 102. As used herein, a trace 113 is a trace that includes sufficient data to enable code of an application 112 that was previously executed at processor 102 to be replayed via emulation, such that an emulator can simulate execution of this code in substantially the same manner as it executed prior. There are a variety of approaches that might be used to record and store such traces 113.

In embodiments, the tracing approaches used by the coprocessor 105 and the processor 102 are built upon the recognition that processor instructions generally fall into one of three categories: (1) instructions identified as "non-deterministic" as not producing predictable outputs because their outputs are not fully determined by data in general registers (e.g., registers 107*a*) or a cache (e.g., cache 108), (2) deterministic instructions whose inputs do not depend on memory values (e.g., they depend only on processor register values, or values defined in the code itself), and (3) deterministic instructions whose inputs depend on reading values from memory. Thus, in some embodiments, storing enough state data to reproduce the execution of instructions can be accomplished by addressing: (1) how to record non-deterministic instructions that produce output not fully determined by their inputs, (2) how to reproduce the values of input registers for instructions depending on registers, and (3) how to reproduce the values of input memory for instructions depending on memory reads.

To address the challenge of reproducing execution of non-deterministic instructions that produce output not fully determined by their inputs, embodiments might record into a trace 113 the side-effects of execution of such instructions (e.g., those instructions' outputs). As used herein, "non-deterministic" instructions can include somewhat less common instructions that (i) produce non-deterministic output each time they are executed (e.g., RDTSC on INTEL processors, which writes the number of processor cycles since the last processor reset into a register), that (ii) may produce a deterministic output, but depend on inputs not tracked during trace recording (e.g. debug registers, timers, etc.), and/or that (iii) produce processor-specific information (e.g., CPUID on INTEL processors, which writes processor-specific data into registers). Storing the side-effects of execution of such instructions may include, for example, storing register values and/or memory values that were changed by execution of the instruction. In some architectures, such as from INTEL, processor features such as those found in Virtual Machine eXtensions (VMX) could be used to trap instructions for recording their side effects into a trace 113.

Addressing the challenge of how to reproduce the values of input registers for deterministic instructions (e.g., whose inputs depend only on processor register values) is straightforward, as they are the outputs of the execution of the prior instruction(s). Thus, a trace 113 can represent the execution of an entire series of processor instructions by storing data that can be used to reproduce the register values at the beginning of the series.

To address how to reproduce the values of input memory for deterministic instructions whose inputs depend on memory values, embodiments might record into a trace 113 the memory values that these instructions consumed (i.e., the reads)—irrespective of how the values that the instructions read were written to memory. In other words, a trace 113 might represent the values of memory reads, but not necessarily the memory writes. For example, although values may be written to memory by a current thread, by another thread (including the kernel, e.g., as part of processing an interrupt), or by a hardware device, it is just the values that the thread's instructions read that are needed for full replay of instructions of the thread that performed the reads. This is because it is those values that were read by the thread (and not necessarily all the values that were written to memory) that dictated how the thread executed.

One hardware-based approach to recording these reads is built on the recognition that a processor (e.g., processor 102) forms a semi- or quasi-closed system. For example, once portions of data for a thread (i.e., code data and runtime application data) are loaded into the cache 108, processor 102 can run by itself—without any input—as a semi- or quasi-closed system for bursts of time. In particular, once the cache 108 is loaded with data, one or more of processing units 107 execute instructions from a code portion of the cache 108, using runtime data stored in a data portion of the cache 108 and using the registers 107a. When a processing unit 107 needs some influx of information (e.g., because an instruction it is executing, will execute, or may execute accesses code or runtime data not already in the cache 108), a "cache miss" occurs and that information is brought into the cache 108 from system memory 103. The processing unit 107 can then continue execution using the new information in the cache 108 until new information is again brought into the cache 108 (e.g., due to another cache miss or an un-cached read). Thus, embodiments might record into a trace 113 sufficient data to be able to reproduce the influx of information into the cache 108 as a traced code executes. In addition, embodiments might also record into the trace 113 sufficient data to be able to reproduce any un-cached or uncacheable reads. In embodiments, when multi-layer caches are used, hardware-based tracing approaches might record influxes at a particular "logged" cache layer. Thus, for example, in the example environment 200 of FIG. 2, if logging is being performed on an L2 layer, a logged influx might be served by an L3 layer and/or system memory 202.

In addition, there can be additional optimizations to cache-based tracing. For example, one optimization is to track and record only the cache lines that were consumed by each processing unit 107, rather than simply recording the cache influxes. As will be appreciated by one of ordinary skill in the art, this can result in significantly smaller trace files than simply recording the cache influxes. As used herein, a processing unit 107 has "consumed" a cache line when the processing unit 107 is aware of its present value. This could be because the processing unit 107 is the one that wrote the present value of the cache line, or because the processing unit performed a read on the cache line (which may cause an influx to the cache line if it was not already current with system memory 103). In implementations, these optimizations might involve extensions to the cache 108 that enable the processor 102 to identify, for each cache line, one or more processing units 107 that consumed the present value of the cache line. For example, each cache line may be extended with one or more tracking bits. Depending on the number of tracking bits, and on implementation of logic using those tracking bits, these tracking bits could be used, for example, to indicate whether or not any processing unit 107 has consumed the cache line (e.g., a single flag bit), which specific one or more processing unit(s) 107 have consumed the cache line (e.g., a tracking bit per processing unit 107), an index to a single processing unit that has consumed the cache line (e.g., by using a plurality of tracking bits to store an integer index), and the like.

Figure 3:
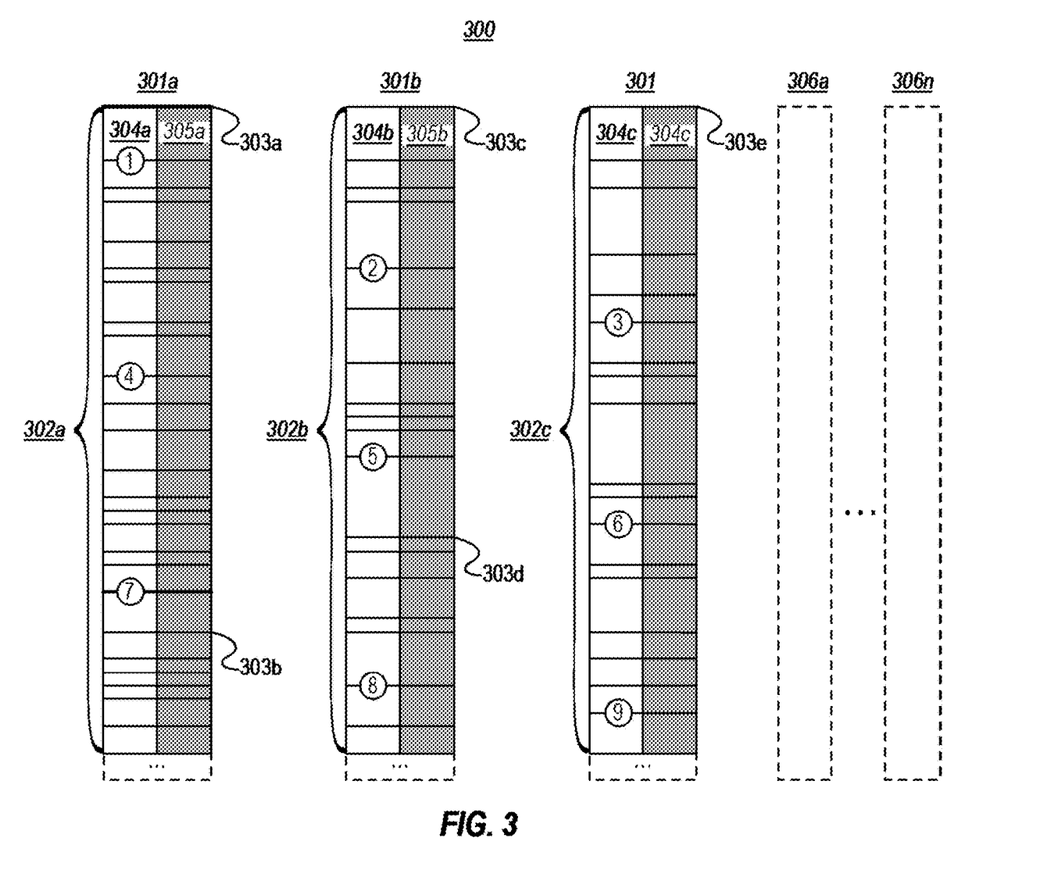
FIG. 3 illustrates one example of a time-travel debugging trace.

FIG. 3 illustrates one example of a trace 300, which might correspond to a trace of FIG. 1, and which could be created in accordance with one or more of the foregoing tracing techniques. In the example of FIG. 3, trace 300 includes one or more trace data streams 301. In FIG. 3, three trace data streams 301 are illustrated (i.e., trace data streams 301a-301c). In embodiments, each trace data stream 301 represents execution of a different thread that executed from the code of application 112. For example, trace data stream 301a might represent execution of a first thread of application 112, trace data stream 301b might represent execution of a second thread of application 112, and trace data stream 301c might represent execution of a third thread of application 112. As shown, each trace data stream 301 comprises a plurality of data packets 302 (i.e., data packets 302a for trace data stream 301a, data packets 302b for trace data stream 301b, and data packets 302c for trace data stream 301c). In other embodiments, each trace data stream 301 might only represent a subset of execution of a thread, such that multiple trace data streams 301 are needed to full represent execution of the thread. In yet other embodiments, a trace data stream 301 might represent execution of a plurality of threads (e.g., plural threads that executed at a single processing unit 107). Since the particular data logged in each data packet 302 might vary, they are shown as having varying sizes. As will be appreciated in view of the forgoing discussions of trace techniques, a data packet 302 might represent at least the inputs (e.g., register values, memory values, cache line data, etc.) to one or more executable instructions that executed as part of this first thread of the application 112.

As shown, the trace data streams 301 might also include one or more key frames 303 (e.g., key frames 303a-303e) that each represents sufficient information, such as a snapshot of register and/or memory values, that enables the prior execution of the thread containing the key frame to be replayed, starting at the point of the key frame 303 forwards. In addition, trace data stream 301 might include one or more sequencing events, shown in FIG. 3 as circles numbers 1-9. While, in embodiments, each trace data stream 301 generally represents execution of a corresponding single thread, sequencing events represent the occurrence of events that are orderable across the threads (and, thus, across the trace data streams 301). These sequencing events may correspond, for example, to events in which threads interact, such as through shared memory, via function calls, etc. While, for simplicity, the order of events in trace data streams 301 rotate through the threads a round-robin manner, it will be appreciated that they would typically appear in a less predictable manner.

In embodiments, a trace 113 might also include the actual code that was executed. Thus, in FIG. 3, each data packet 302 is shown as including a non-shaded data inputs portion 304 (i.e., data inputs portion 304a for data packets 302a, data inputs portion 304b for data packets 302b, and data inputs portion 304c for data packets 302c) and a shaded code portion 305 (i.e., code portion 305a for data packets 302a, code portion 305b for data packets 302b, and code portion 305c for data packets 302c). In embodiments, the code portion 305 in the packets 302 might include the executable instructions that executed based on the corresponding data inputs. In other embodiments, however, a trace 113 might omit the actual code that was executed, instead relying on having separate access to the code of the application 112. In these other embodiments, each data packet may, for example, specify an address or offset to the appropriate executable instruction(s). As shown, a trace 113 might include any number of additional data streams 306 (i.e., data streams 306a-306n), which can store any type of additional trace data. This additional trace data may include, for example, indexing data such as occasional memory snapshots, reverse-lookup data structures for quickly locating memory addresses/values in the trace data streams 301, etc.

As mentioned, a hardware-based tracing approach might record a trace 113, at least in part, based on recording the side effects of non-deterministic instructions, the influxes of data to the cache 108, and any uncached/uncacheable reads. While it is possible that the processor 102 could fully accomplish this task, the embodiments herein utilize the coprocessor 105 to perform a least part of this tracing work, including recording the influxes of data to the cache 108.

As will be appreciated by those of ordinary skill in the art, use of a coprocessor 105 in this manner can provide several advantages. For instance, from a processor design and manufacturing perspective, it will be appreciated that it might be difficult, and expensive, to add full tracing circuitry/logic to a processor 102. For instance, adding such circuitry/logic might be difficult in view of the already very complicated design of modern processors. Additionally, adding such circuitry/logic may result in a larger processor die size, which can harm yield rates during manufacture. From a performance standpoint, any resources utilized by the processor 102 to perform logging task might be resources that could have been used to execute application code. Also, logging may frequently interact with system memory 103 (e.g., to write trace 113'), and memory interactions are one of the most expensive (e.g., in terms of processor clock cycles) operations that a processor can perform. Thus, logging by the processor 102 can lead to a real and substantial impact on application performance. In addition, since logging by the processor 102 can lead to increased utilization of processor resources when logging, any logging activity by the processor 102 can generate additional heat and increase power consumption of the processor 102. Use of a coprocessor 105 can avoid, or at least lessen, each of these drawbacks to fully logging by processor 102, by moving logging logic to a separate die, and by providing devoted circuitry/logic to perform the logging.

While the disclosure herein is focused primarily on use of the coprocessor 105 to record the consumption of data in the cache 108 (e.g., a write to a cache line, a read from a cache line, an influx to a cache line), it will be appreciated that the coprocessor 105 could be used to record virtually any type of trace data on behalf of the processor 102. This can include, for example, initial state (i.e., when logging first begins), memory snapshots, key frames, checkpoints, uncached/uncacheable reads, etc.

Referring again to FIG. 1, coprocessor 105 can include control logic 110. Similar to the control logic 109 in the processor 102, the control logic 110 in the coprocessor 105 can include CCP logic 110a and logging logic 110b (though, as will be explained, the functionality of the CCP logic and the logging logic differs between the processor and the coprocessor). As shown, the coprocessor might also include a cache 111 which might, for example, serve as a temporary buffer to store data prior to writing it to a trace 113 or sending it over the communications channel 114.

In general, the CCP logic 109a at the processor 102 sends CCP messages on the bus 106, while the CCP logic 109a at the coprocessor 105 listens for those CCP messages on the bus 106. As such, the coprocessor 105 can be at least a passive direct memory access (DMA) participant. In embodiments, the processor 102 sends onto the bus 106 at least CCP messages relating to data consumption (e.g., influxes of data from system memory 103 to at least one level in the cache 108, or a read/write by a processing unit 107 to/from a cache line). These CCP messages will vary depending on the CCP protocol, but they are generally messages used by a processor to ask for the cache line at a particular address, used by a processor to promote a cache line from shared to exclusive, and the like (as well as the responses to those messages). When the coprocessor 105 receives CCP message(s) indicating that there was a data consumption, the logging logic 110b at the coprocessor 105 can initiate logging of that consumption (e.g., to trace 113 or to the communications channel 114). This could include, for example, logging the value(s) of one or more memory cells that were part of a cache influx, logging the value(s) of one or more memory cells that were part of a read/write by a processing unit 107 to/from a cache line, etc. The coprocessor 105 might obtain the memory cell value(s) 106 from the bus 106 (e.g., as they are being communicated to the cache 108 as part of a cache miss), from system memory 103, or even from the cache 108.

In general, the logging logic 109b at the processor 102 also performs one or more logging tasks not offloaded to the coprocessor 105. This could include, for example, recording the side-effects of non-deterministic instructions, recording key frames, recording memory snapshots, recording checkpoints (e.g., a checksum/hash of the values of one or more registers), etc. In embodiments, the logging logic 109b could record this information directly (i.e., by processor 102), though it could alternatively request that the coprocessor 105 record any of this information (e.g., via a request over the bus 106).

In embodiments, the logging logic 109b at the processor 102 might record its trace data for a given thread into one or more trace data streams, while the logging logic 110b at the coprocessor 105 might record its trace data for that same thread into one or more other trace data streams. If this is the case, one or both of logging logic 109b and/or logging logic 109c might record with that data timing information (e.g., instruction counts or other timer information) that can be used to stitch together those data steams to create a single data stream for the thread. Of course, logging logic 109b and logging logic 110b could alternatively record trace data into the same data stream for a given thread.

As will be appreciated, it is possible that system memory 103 might be modified by something other than the processor 102—i.e., some other DMA device. In embodiments, the CCP logic 110a at the coprocessor 105 can detect such memory modifications, and use the logging logic 110b to log them. For example, the logging logic 110b might record an address or address range that was affected by a DMA operation along with when it occurred, and/or the new memory cell values. In embodiments, it may be desirable to log addresses (and/or addresses ranges), but refrain from recording the changed values. This is because those values will appear as an influx if they are actually consumed by code executing at the processor 102, and can be logged by the coprocessor 105 at that time. Nonetheless, by recording when a DMA operation occurred, and what memory address (es) were affected, a debugger consuming the trace 113 can at least surface this information. In other embodiments, it may be desirable to log changed values, but refrain from recording address information. If the logging logic 110b logs the values changed by DMA as they occur (potentially with compression), and then logs CCP traffic (without values) when those values are consumed, it might be possible to achieve a reduced trace size (i.e., as compared to recording addresses but not values).

In embodiments, the CCP logic 110a might actively participate in the processor's CCP. Thus, rather than being a passive DMA participant (i.e., read only), it might be an active DMA participant (i.e., read/write). If this is the case, additional scenarios are enabled, such as the coprocessor 105 participating in initial memory snapshots, or the coprocessor 105 actually fulfilling cache influx requests. These concepts are described in more detail below.

Figure 4:
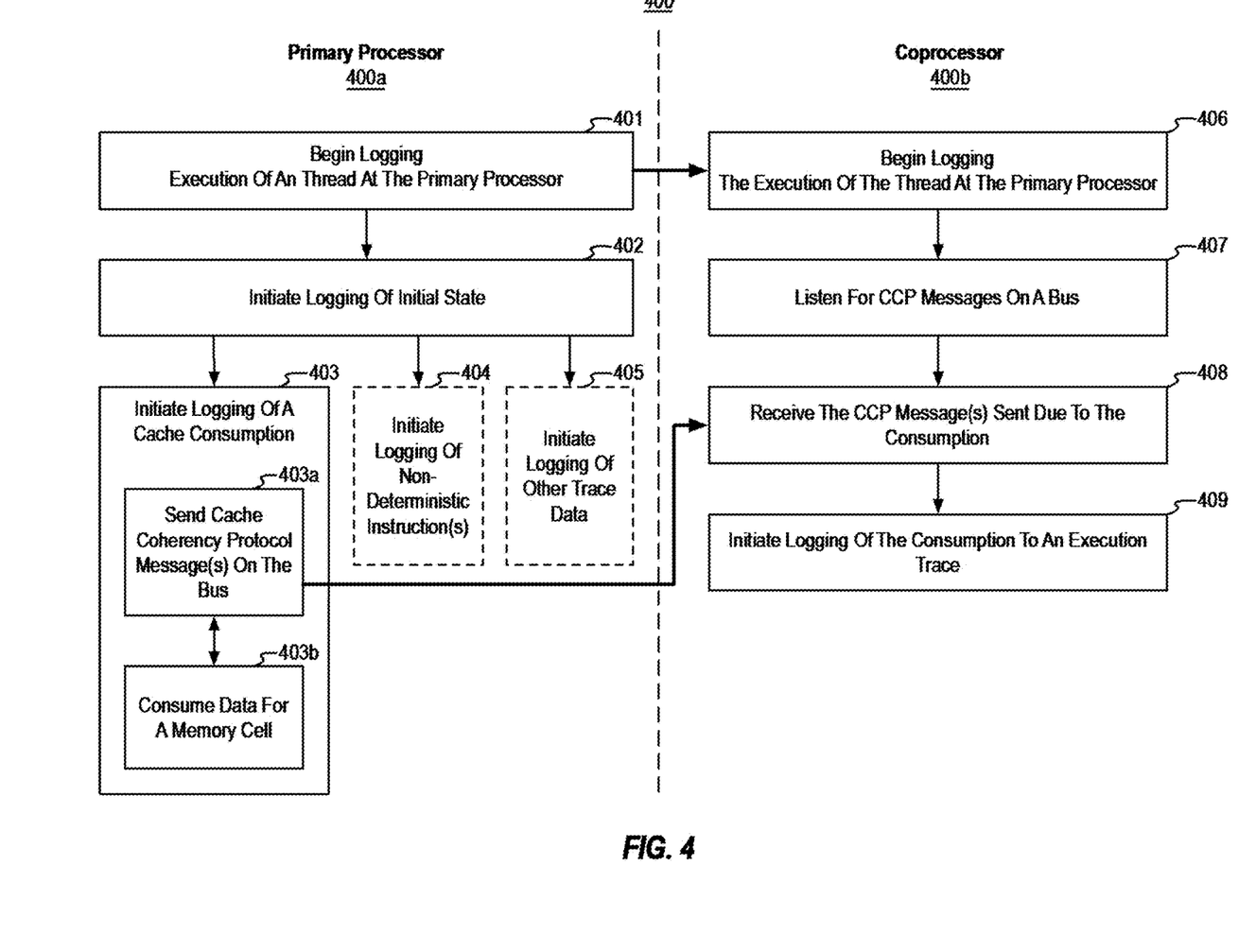
FIG. 4 illustrates a flowchart of an example method for storing at least part of an execution trace using a coprocessor.

FIG. 4 illustrates a flow chart of an example method 400 for storing at least part of an execution trace using a coprocessor. The discussion of method 400 refers method acts (i.e., acts 401-409). Although these method acts may be discussed in a certain orders or may be illustrated in the flow chart as occurring in a particular order, no particular ordering is required unless specifically stated, or required because an act is dependent on another act being completed prior to the act being performed.

Method 400 will be described within the context of FIGS. 1-3, and with reference to the flowchart of FIG. 4. Referring to FIG. 1, for example, method 400 might be implemented at a computer system (e.g., computer system 101) that comprises one or more primary processors (e.g., one or more processors 102) that are associated with a memory cache (e.g., cache 108), one or more coprocessors (e.g., coprocessor 105), and one or more busses (e.g., bus 106) interconnecting the primary processor and the coprocessor.

As shown in FIG. 4, method 400 can include acts that are performed by the primary processor 102, and acts that are performed by the coprocessor 105. In embodiments, acts performed by primary processor(s) 102 might be orchestrated, at least in part, by control logic 109, and acts performed by coprocessor(s) 105 might be orchestrated, at least in part, by control logic 110. It will be appreciated however, method 400 can alternatively be viewed as two related, but distinct, methods—one (i.e., method 400a, comprising acts 401-405) fully performed at primary processor (s) 102, and another (i.e., method 400b, comprising acts 406-409) fully performed at coprocessor(s) 105. In embodiments, method 400 operates based, at least in part, on the primary processor 102 executing one or more executable instructions of an executable entity (e.g., application 112).

As shown, method 400 comprises an act of 401, at the primary processor, of beginning logging execution of a thread at the primary processor. For example, in connection with the primary processor executing one or more executable instructions of one or more threads of application 112, the logging logic 109b can initiate logging of at least one of those threads. Notably, this logging might be initiated when execution of the thread is initiated, or at some other time after the thread has been executing. As shown by the arrow between acts 401 and 406, method 400 can include a corresponding act 406, at the coprocessor, of beginning logging of the execution of the thread at the primary processor. For example, logging logic 109b at processor 102 might signal the logging logic 110b at coprocessor 105 that logging has been enabled/initialized for a thread and/or for a processing unit 107. Thus, the logging logic 110b at coprocessor 105 can initiate its own logging for the thread/processing unit.

As shown, based on having begun logging of the execution of the thread at the primary processor in act 406, the coprocessor 105 can listen for CCP messages on a bus in act 407. For example, the coprocessor 105 can listen on bus 106. In embodiments, act 407 could include the coprocessor 105 listening on a single bus, or on a plurality of busses. In embodiments, act 406 might comprise the coprocessor 105 "snooping" on an existing bus signal that is otherwise point-to-point with another DMA participant on the bus 106. In some implementations of this embodiment, the coprocessor 105 may be implemented as a "receive-only tap" (i.e., without indicating its presence on the bus 106). In other embodiments, act 406 might comprise the coprocessor 105 operating as a "man-in-the-middle" that intercepts CCP messages and forwards them on to other DMA participants.

FIG. 4 also shows that, after beginning logging execution of the thread at the primary processor 102 in act 401, the primary processor 102 can initiate logging of initial state at act 402 (i.e., using logging logic 109b). Notably, the logging logic 109b might record any of this initial state information (or any other trace data for that matter) itself, or may request that the coprocessor 105 record it instead. This initial state can include any information that can be used to later initiate emulation of the thread, beginning at the point at which logging was commenced in act 401. If logging was commenced (i.e., in act 401) at substantially the same time that execution of the thread was commenced, this might mean the logging logic 109b initiating recording a key frame that includes the state of one or more registers 107a of a processing units 107 that is executing the thread. Thus, in act 402, the processor 102 may initiate storing of initial state of one or more registers at a beginning of tracing.

If logging was commenced (i.e., in act 401) after the thread had already been executing, in addition to recording register state, this may mean the logging logic 109b recording a memory snapshot, such as of the values stored in the cache 108. As an alternative to recording a memory snapshot, the primary processor 102 might flush the cache 108, so that any reads that occur after logging was enabled will appear as influxes to the cache 108 (and thus can be logged by the coprocessor 105). Thus, in connection with act 402, in addition to recording register state the primary processor 102 might flush the memory cache 108 at the beginning of tracing.

As mentioned, the CCP logic 110a might actively participate in the processor's CCP. If this is the case, there may be additional options for snapshotting initial state of the cache 108. For example, the primary processor 102 might give the coprocessor 105 the values of the cache 108 for logging by the coprocessor 105. Notably, recording a snapshot of the cache 108 (either by the primary processor 102 or the coprocessor 105) could take a significant number of processor clock cycles, meaning that the primary processor 102 may need to stall execution of application code (for a potentially significant amount) until the snapshotting is complete. Thus, in act 402, the coprocessor 105 might participate in the CCP to receive initial state of the memory cache 108 at a beginning of tracing, and the primary processor 102 might wait for the coprocessor 105 to store the memory cache 108 into the execution trace 113 at the beginning of tracing.

Alternatively, if CCP logic 110a actively participates in the CCP, the CCP logic 109a at the primary processor 102 might initiate transfer of initial cache state by giving at least a subset of the lines of the cache 108 to the coprocessor 105 in a shared (or equivalent) CCP state. A used herein, when a cache line is in a "shared" CCP state, is generally illegal for any entity (including the primary processor 102) to modify the cache line without first notifying other entities (e.g., the coprocessor 105) that also have the cache line in the shared state. Thus, in embodiments, after giving cache lines to the coprocessor 105 in the shared CCP state, the primary processor 102 can resume application code execution without waiting for a full snapshot to be stored by the coprocessor 105. The coprocessor 105 can then log the cache lines as it has resources to do so by obtaining their values from system memory 103, and then release its shared status on any logged cache lines. If the primary processor 102 needs to modify one of these cache lines before the coprocessor 105 has logged it, the coprocessor 105 is made aware prior to the modification by virtue of the cache line being shared, so the coprocessor 105 can be sure to log that cache line before the modification is enacted. If, for some reason, a cache line is not sharable, the primary processor 102 might evict the cache line, give the cache line's value to the coprocessor 105 directly, or do whatever is appropriate to make the cache line sharable. Accordingly, in act 402, the coprocessor 105 might participate in the CCP to receive initial state of the memory cache 108 at a beginning of tracing, and the primary processor 102 might give at least one cache line in the memory cache 108 to the coprocessor 105 in a shared CCP state at the beginning of tracing, while the coprocessor 105 obtains a value for the at least one cache line from a memory backing the memory cache 108.

FIG. 4 also shows that, after initiating logging of initial state in act 402, the primary processor 102 can perform one or more of several acts (serially or parallelly). For example, the primary processor 102 might initiate logging of a cache consumption (i.e., act 403), might initiate logging of one or more non-deterministic instructions (i.e., act 404), and/or might initiate logging of other trace data (i.e., act 405).

With reference to act 403, initiating storing of a cache consumption might include sending CCP messages on the bus (at 403a) and consuming data for a memory cell (act 403b). It is noted that, in FIG. 4, acts 403a and 403b are connected via a double-ended arrow. This signifies that this description (and the claims) enforces no ordering between acts 403a and 403b unless otherwise specified. Thus, depending on implementation, acts 403a and 403b might be performed parallelly or serially (in either order).

In some implementations, act 403a can comprise, based on the primary processor executing the one or more executable instructions, the primary processor sending one or more CCP messages on the bus, the one or more CCP messages corresponding to a memory cell. In some implementations, act 403b can comprise, based on the primary processor executing the one or more executable instructions, the primary processor consuming data for the memory cell. For example, as part of executing a traced thread of application 112, the processor 102 might execute a machine code instruction of application 112 that uses a memory cell value (i.e., from system memory 103) as an input.

If that memory cell value was already in the cache 108 (i.e., current with system memory 103), execution of the instruction can cause the primary processor 102 to consume that value and set a tracking bit on the appropriate cache line to indicate that it was consumed. Thus, in act 403b, the primary processor consuming data for the memory cell might comprise the memory cache providing existing data for the memory cell to a processing unit 107. This providing of data can be orchestrated by one or more CCP messages, and the primary processor 102 might send at least a portion of these CCP messages on the bus 106 in act 403a (e.g., using CCP logic 109a). In embodiments, these CCP messages might include CCP message specifically intended for the coprocessor 105, since it may not be typical to send CCP messages to a bus in this situation.

If that memory cell value was not already in the cache 108, execution of the instruction can cause a cache miss on the memory cell, which initiates an influx of that memory cell's value from the system memory 103 to the cache 108. Thus, in act 403b, the primary processor 102 consuming data for the memory cell might comprise the memory cache 108 influxing data for the memory cell. This cache miss can be orchestrated by one or more CCP messages, and the primary processor 102 can send at least a portion of these CCP messages on the bus 106 in act 403a (e.g., using CCP logic 109a). In embodiments, these CCP messages might be conventional CCP messages used to conduct a cache miss, such as CCP messages communicated to a memory controller for system memory 103. However, in other embodiments, these CCP messages might include CCP message specifically intended for the coprocessor 105.

As was already described, the coprocessor 105 listens on the bus 106 for CCP message (i.e., act 407). Thus, as shown by the arrow between acts 403a and 408, method 400 can include a corresponding act 408, at the coprocessor, of receiving the CCP messages sent due to the consumption. In some implementations, act 408 can comprise the coprocessor receiving the one or more CCP messages from the bus. For example, as mentioned, the CCP logic 110a might "snoop" the CCP messages sent in act 403a on the bus 106, might intercept the CCP messages sent in act 403a on the bus 106, or otherwise receive the CCP messages sent in act 403a from the bus 106.

FIG. 4 also shows that, after receiving the one or more CCP messages from the bus in act 408, the coprocessor 105 can perform an act 409 of initiating logging of the consumption to an execution trace. In some implementations, act 409 comprises, based on the coprocessor receiving the one or more CCP messages, the coprocessor initiating storing the consumed data for the memory cell into the execution trace. For example, the logging logic 110b at the coprocessor 105 might insert one or more data packets 302 into one or more trace data streams 301 that represent the consumption. For instance, if, in act 403b, the memory cache provided existing data for the memory cell, act 409 might comprise generating a data packet 302 representing that provided data, or some proxy for it. Since, in this instance, this data may have already been logged to the trace 113 (e.g., as part of a prior influx), a proxy for that provided data might be a reference to that data, such as a reference to that data already stored in one or more of the trace data stream 301. If, on the other hand, in act 403b, the memory cache influxed data for the memory cell, act 409 might comprise generating a data packet 302 representing that influxed data.

As mentioned, the coprocessor 105 might send trace data to a trace 113' in system memory 103, or it could send that trace data over a communications channel 114. As such, in act 409, the coprocessor initiating storing of the consumed data for the memory cell into the execution trace could comprise at least one of (i) the coprocessor writing a portion of trace data to memory, or (ii) the coprocessor sending the portion of trace data over a communications channel.

As shown in FIG. 1, the coprocessor 105 might include compression logic 110c. In general, this compression logic 110c can compress any trace data prior to storing it (e.g., to system memory 103) or sending it (e.g., over a communications channel 114). In embodiments, the compression logic 110c not only compress trace data generated by the coprocessor 105, but also compress trace data generated by the processor 102 (i.e., any data generated by logging logic 109b). In embodiments, the compression logic 110c performs a lossless compression, such as with a general-purpose lossless compression algorithm (e.g., gzip, bzip2, LZMA, and the like). Additionally, or alternatively, the compression logic 110c might perform domain-specific compression (i.e., compressing memory addresses and data values based on knowledge that they are such). Example domain-specific compression techniques are disclosed in Applicant's co-pending application, U.S. application Ser. No. 15/349,474, filed Nov. 11, 2016, entitled, "REDUCING STORAGE REQUIREMENTS FOR STORING MEMORY ADDRESSES AND VALUES," the entire contents of which are incorporated by reference herein in their entirety. In view of this description of compression logic 110c, it will be appreciated that act 409 can include the coprocessor 105 compressing one or more portions of the execution trace.

Returning to act 402, after initiating logging of initial state, the primary processor 102 might additionally, or alternatively, initiate logging of non-deterministic instruction(s) in act 404. For example, the logging logic 109b might determine the side-effects (i.e., outputs) of one or more executed instructions whose outputs do not rely solely on their inputs, and generate one or more data packets representing those instructions' execution (e.g., representing their outputs). Thus, method 400 could comprise the primary processor initiating storing of a result of executing a non-deterministic instruction. Act 404 is shown in broken lines, indicating that it could be optional. If act 404 is not performed, it may be possible to reconstruct some of the traced execution of application 112 (e.g., from the consumption data recorded in act 409), however the resulting trace 113 may not be fully "bit-accurate" (i.e., there may be some prior execution state that cannot be fully reconstructed from the trace 113).

Returning to act 402, after initiating logging of initial state, the primary processor 102 might additionally, or alternatively, initiate logging of other trace data in act 405. For example, in addition to logging non-deterministic instructions (i.e., act 404), the logging logic 109b at processor 102 could also initiate storing of various other types of trace data, such as occasional key frames, checkpoint data, memory writes, or any other type of data that would be useful to reconstruct execution. Similar to act 404, act 405 is also shown in broken lines, indicating that it could be optional.

It will be appreciated, in view of the disclosure herein, that the primary processor 102 initiating storing of one or more other portions of trace data in acts 404 and/or 405 (e.g., representations of nondeterministic instructions, key frames, checkpoints, writes, etc.) into the execution trace could comprise one or both of (i) the primary processor 102 storing the one or more other portions of trace data into the execution trace 113 directly, or (ii) the primary processor 102 instructing the coprocessor 105 to store the one or more other portions of trace data into the execution trace 113. Additionally, if the primary processor stores the one or more other portions of trace data into the execution trace directly, the primary processor might store the data into a different trace data stream 301 than a trace data stream into which the coprocessor stores the consumed data for the memory cell in act 409.

As described in connection with FIG. 2, a cache 108 could comprise a plurality of cache levels (e.g., L1, L2, L3, etc.). In embodiments, method 400 might be performed generally based on activity at a single cache level. For example, if the cache 108 includes L1 and L2 cache levels, method 400 might be performed to use the coprocessor 105 to log consumptions at the L2 cache level (e.g., to log influxes to the cache 108 generally). Thus, in method 400, the memory cache might comprise a plurality of cache levels (e.g., L1 and L2 cache levels), in which the memory cache stores the consumed data for the memory cell at a first cache level (e.g., the L2 cache level), and the one or more CCP messages are one or more first CCP messages that relate to activity of the first cache level (e.g., the L2 cache level). However, by doing so, the resulting trace 113 might lack information about processor activity that did not affect that cache level. For instance, referring to FIG. 2, processing units A1 and A2 might operate on their respective L1 caches (i.e., L1-A1 and L1-A2), and this activity might not be captured fully by logging at the L2 cache level (e.g., L2-A1). In embodiments, the primary processor 102 and/or the coprocessor 105 are configured to capture additional trace data to facilitate a reconstruction of this activity. There are various approaches that could be used, either singly or in combination.

In some embodiments, an approach configures the CCP logic 109a at the primary processor 102 to also send CCP message relating to activity at one or more other cache levels onto the bus 106. Thus, the CCP logic 110a at the coprocessor 105 can receive these CCP messages, and the logging logic 110b can log trace data based on these CCP messages as appropriate. Thus, in method 400, the primary processor might also send one or more second CCP messages on the bus relating to activity of a second cache level; the coprocessor might receive the one or more second CCP messages from the bus; and, based on the coprocessor receiving the one or more second CCP messages, the coprocessor might initiate storing of trace data into the execution trace relating to the activity of the second cache level. It will be appreciated that sending these second CCP messages on the bus 106 will result in additional traffic on the bus 106, which generally has a limited amount of available bandwidth. As such, sending these second CCP messages on the bus 106 might harm overall system performance. Thus, in embodiments, the primary processor only sends CCP messages on the bus relating to activity of a second cache level when execution trace logging is enabled (e.g., at act 401) and/or uses a separate bus for these messages.

In other embodiments, an approach configures the logging logic 109b/110b at the primary processor 102 and/or the coprocessor 105 to log a code flow trace, which would be usable to reconstruct activity at one or more non-logged cache levels. As will be appreciated by one of ordinary skill in the art, a code flow trace generally captures the results of branch/code flow instructions (e.g., machine code instructions used to implement loops, "if" statements, switches etc.). In embodiments, the logging logic 109b/110b at the primary processor 102 and/or the coprocessor 105 might log only a subset of these code flow instructions, such as indirect jumps that have non-predictable returns and conditional branches after a memory barrier. When recording a subset of code flow information, rather than all code flow information, the logging logic 109b/110b at the primary processor 102 and/or the coprocessor 105 might omit such code flow information as conditional jumps not near a memory barrier and predictable returns. In view of the foregoing, it will be appreciated that, in method 400, at least one of the primary processor or the coprocessor could initiate storing of at least a portion of a code flow trace into the execution trace. This could include, for instance, the primary processor storing at least a subset of a code flow trace directly (which could include omitting storing at least one code flow trace event type). Alternatively, this could include the primary processor sending one or more messages on the bus relating to code flow (which could include omitting sending messages relating to at least one code flow trace event type); the coprocessor receiving these messages from the bus; and, based on the coprocessor receiving the messages, the coprocessor initiating storing of at least a subset of a code flow trace. In either case, initiating storing of the at least a portion of the code flow trace into the execution trace could initiating storing of one or more of (i) an indirect jump with a non-predictable return, or (ii) a conditional branch after a memory barrier.

In other embodiments, an approach configures the logging logic 109b/110b at the primary processor 102 and/or the coprocessor 105 to log one or more memory writes. As will be appreciated by one of ordinary skill in the art, if you have a program's writes you have all of its outputs, and this information can be used to reconstruct activity at one or more non-logged cache levels. For example, the logging logic 109b at the primary processor 102 might log writes directly, or the primary processor 102 might send messages relating to storing of these writes on the bus 106 (even if they are not actually being committed to system memory 103). Thus, the coprocessor 105 can receive these messages, and the logging logic 110b at the coprocessor 105 can log them. In embodiments, the coprocessor 105 can "collapse" writes (e.g., by only logging them when there are cache evictions). For example, the coprocessor 105 might store the writes of a memory cell in its cache 111, keeping the cache 111 updated as it observes writes to that memory cell. Then, when there is an actual eviction from the cache 108, the logging logic 110b might log the value stored in its own cache 111. Alternatively, the primary processor 102 might notify the coprocessor 105 that it is evicting a cache line that is dirty (or moving it to a shared state). Then, the coprocessor 105 can log the current data value. This reduces bus traffic since it can be one message for what often will be many writes. In view of the foregoing, it will be appreciated that, in method 400, at least one of the primary processor or the coprocessor might initiate storing of at least one write caused by execution of the executable entity into the execution trace. This could include, for instance, the primary processor storing a write directly. Alternatively, this could include the primary processor sending one or more messages on the bus relating to the write; the coprocessor receiving these message(s) from the bus; and, based on the coprocessor receiving the message(s), the coprocessor initiating storing of the write, or a coalesced representation of a set writes (i.e., the last value in the series).

In other embodiments, an approach configures the logging logic 109b/110b at the primary processor 102 and/or the coprocessor 105 to log one or more checkpoints, which would be usable to reconstruct activity at one or more non-logged cache levels. For example, the logging logic 109b at the primary processor 102 might occasionally generate a checksum/hash over the value(s) of one or more registers 107a, and/or other processor state. The logging logic 109b might then store this checkpoint to the trace 113 directly, or request that the logging logic 110b at the coprocessor 105 do it. Later, during trace replay, if there is ambiguity as to which of a finite set of execution branches were taken, a checkpoint can be used to determine which one was actually taken during trace recording (e.g., by generating a similar checkpoint for each of these branches from emulated processor state, and comparing these checkpoints with the one that was logged). In view of the foregoing, it will be appreciated that, in method 400, at least one of the primary processor or the coprocessor might initiate storing of at least one checkpoint, which is based on (e.g., a checksum/hash over) one or more register values at the primary processor during execution of the executable entity. This could include, for instance, the primary processor storing a checkpoint directly. Alternatively, this could include the primary processor sending one or more messages on the bus relating to the checkpoint; the coprocessor receiving these message(s) from the bus; and, based on the coprocessor receiving the message(s), the coprocessor initiating storing of the checkpoint.

Regardless of the approach used (e.g., exposing additional CCP data, logging a code flow trace, logging writes, logging checkpoints, etc.), the logging logic 109b/110b at the primary processor 102 and/or the coprocessor 105 could be configured log other timing information, which can be further used to aid in resolving ambiguities in trace data. Example timing information includes, for example, instruction counts or other timing information. In view of the foregoing, it will be appreciated that, in method 400, at least one of the primary processor or the coprocessor might initiate storing of timing information. This could include, for instance, the primary processor storing timing information directly. Alternatively, this could include the primary processor sending one or more messages on the bus relating to timing information; the coprocessor receiving these message(s) from the bus; and, based on the coprocessor receiving the message(s), the coprocessor initiating storing of the timing information.

As mentioned earlier, the CCP logic 110a might actively participate in the processor's CCP (i.e., read/write). If so, this can enable further functionality by the coprocessor 105. For example, the coprocessor 105 could, itself, act as a "side" cache for the processor 102. For instance, as explained above, the coprocessor 105 might use its cache 111 to log writes as they are evicted by keeping up to date on the value written to a given memory cell. Based on activity at the primary processor 102, the cache 108 makes a request (e.g., via a CPP message on the bus 106) for the value of a memory cell while the coprocessor 105 still has it in its cache 111. If so, the coprocessor 105 might provide this value to the cache 108, rather than requiring that the request be fulfilled by system memory 103. Additionally, if this is the case, the coprocessor 105 might avoid logging this influx to the cache 108, since it gave the value to the cache 108 (and thus knows it already). Accordingly, in method 400, the coprocessor might participate in the CCP to fulfill a cache read request on behalf of the primary processor.

As was also mentioned, the coprocessor 105 might detect DMA modifications by other entities, and log them. For example, the logging logic 110b might record an address or address range that was affected by a DMA operation and/or the new memory cell values. Accordingly, in method 400, the coprocessor might initiate storing into the execution trace at least one of a value of a memory cell affected by a DMA event, or an identity of the memory cell affected by the DMA event.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media could include, for example, system memory 103, storage media 104, and on-processor storage (e.g., storing at least a part of control logic 109 and/or control logic 110). Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links (e.g., communications channel 114) which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, processor microcode, or even source code.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A tracing coprocessor that records execution trace data on behalf of a primary processor, based on a cache coherency protocol (CCP) message received from the primary processor, the tracing coprocessor comprising circuitry and logic that causes the tracing coprocessor to at least:
   listen on a bus that communicatively couples the tracing coprocessor with the primary processor;
   based on listening on the bus, identify at least one CCP message sent by the primary processor onto the bus, the at least one CCP message relating to activity at a processor cache of the primary processor, the activity resulting from the primary processor executing at least one executable code instruction, the activity comprising a cache miss that influxes a memory cell data value into the processor cache of the primary processor;
determine, from the at least one CCP message, that the primary processor caused the memory cell data value to be influxed to the processor cache of the primary processor as part of a memory cell consumption by the primary processor;
using direct memory access (DMA), obtain the memory cell data value consumed by the primary processor in connection with execution of the at least one executable code instruction directly from a system memory; and
initiate logging of the memory cell data value obtained directly from system memory using DMA into an execution trace.

2. The tracing coprocessor of claim 1, wherein initiating logging of the memory cell data value into the execution trace comprises at least one of:
initiating storing of the memory cell data value into a system memory or a storage media; or
initiating sending of the memory cell data value onto an external communications channel.

3. The tracing coprocessor of claim 1, wherein initiating logging of the memory cell data value into the execution trace includes initiating logging of timing information in connection with the memory cell data value.

4. The tracing coprocessor of claim 1, wherein the tracing coprocessor:
identifies a DMA operation by a device other than the primary processor; and
initiates logging, into the execution trace, a record of the DMA operation.

5. The tracing coprocessor of claim 4, wherein initiating logging of the DMA operation into the execution trace includes initiating logging of at least one of: a memory address that was affected by the DMA operation, a memory address range that was affected by the DMA operation, a new memory cell value resulting from the DMA operation, or timing information indicating when the DMA operation occurred.

6. The tracing coprocessor of claim 1, wherein the tracing coprocessor also initiates logging, into the execution trace, at least one of: processor register state, a memory snapshot, a key frame, a checkpoint, an uncached read, or an uncacheable read.

7. The tracing coprocessor of claim 1, wherein the memory cell consumption comprises at least one of: a write to a cache line corresponding to the memory cell consumption, a read from the cache line, or an influx to the cache line.

8. The tracing coprocessor of claim 1, wherein, prior to initiating logging of the memory cell data value into the execution trace, the tracing coprocessor stores the memory cell data value in a cache at the tracing coprocessor.

9. The tracing coprocessor of claim 1, wherein the tracing coprocessor is a read/write CCP participant.

10. The tracing coprocessor of claim 9, wherein the tracing coprocessor fulfils at least one cache influx request by the primary processor.

11. The tracing coprocessor of claim 9, wherein the tracing coprocessor:
receives at least a subset of cache lines of the processor cache in a shared CCP state; and
initiates recording of a snapshot of the subset of cache lines into the execution trace.

12. The tracing coprocessor of claim 1, wherein the tracing coprocessor forwards the at least one CCP message to at least one DMA participant.

13. The tracing coprocessor of claim 1, wherein the tracing coprocessor is a receive-only tap on the bus.

14. The tracing coprocessor of claim 1, the processor cache comprising a second level cache, the second level cache serving as a backing store for a plurality of first level caches, the at least one CCP message relating to activity at the plurality of first level caches.

15. The tracing coprocessor of claim 14, wherein existence of the at least one CCP message on the bus implies execution trace logging is enabled for the memory cell consumption.

16. A method, implemented at a tracing coprocessor, comprising:
listening on a bus that is communicatively couples the tracing coprocessor with a primary processor;
based on listening on the bus, identifying a cache coherency protocol (CCP) message sent by the primary processor onto the bus, the CCP message relating to activity at a processor cache of the primary processor, the activity resulting from the primary processor executing at least one executable code instruction, the activity comprising a cache miss that influxes a memory cell data value into the processor cache of the primary processor;
determining, from the CCP message, that the primary processor caused the memory cell data value to be influxed to the processor cache of the primary processor as part of a memory cell consumption by the primary processor;
using direct memory access (DMA), obtain the memory cell data value consumed by the primary processor in connection with execution of the at least one executable code instruction directly from a system memory; and
initiating logging of the memory cell data value obtained directly from system memory using DMA into an execution trace.

17. The method of claim 16, the method further comprising obtaining the memory cell data value from the bus during communication of the memory cell data value from a system memory to the processor cache.

18. The method of claim 16, wherein initiating logging of the memory cell data value into the execution trace comprises at least one of:
initiating storing of the memory cell data value into a system memory or a storage media; or
initiating sending of the memory cell data value onto an external communications channel.

19. The method of claim 16, wherein initiating logging of the memory cell data value into the execution trace includes initiating logging of timing information in connection with the memory cell data value.

20. The method of claim 16, the method further comprising:
identifying a DMA operation by a device other than the primary processor; and
initiating logging, into the execution trace, a record of the DMA operation.

* * * * *